(12) United States Patent
Wyatt et al.

(10) Patent No.: US 7,161,099 B2
(45) Date of Patent: Jan. 9, 2007

(54) WARNING SYSTEM FOR IGNITION SWITCH

(75) Inventors: Christopher K. Wyatt, Hamilton, IL (US); Pat A. Bolen, Carthage, IL (US)

(73) Assignee: Methode Electronics, Inc., Chicago, IL (US)

( * ) Notice: Subject to any disclaimer, the term of this patent is extended or adjusted under 35 U.S.C. 154(b) by 0 days.

(21) Appl. No.: 10/990,390

(22) Filed: Nov. 18, 2004

(65) Prior Publication Data

US 2006/0102454 A1    May 18, 2006

(51) Int. Cl.
*H01H 27/06* (2006.01)
(52) U.S. Cl. .................... 200/43.08; 200/61.66
(58) Field of Classification Search .. 200/43.01–43.09, 200/61.66, 239, 573, 558, 559, 534–536; 307/9.1, 10.1, 10.3
See application file for complete search history.

(56) References Cited

U.S. PATENT DOCUMENTS

| | | | |
|---|---|---|---|
| 1,657,040 A | 1/1928 | Schmid | |
| 1,876,878 A | 9/1932 | Douglas | |
| 1,909,665 A | 5/1933 | Douglas | |
| 2,123,507 A | 7/1938 | Jacobi | |
| 2,215,162 A | 9/1940 | Scott | |
| 2,613,258 A | 10/1952 | Azano | |
| 3,138,780 A | 6/1964 | Jacobsen | |
| 3,393,540 A | 7/1968 | Rink et al. | |
| 3,632,913 A | 1/1972 | Hukuta | |
| 3,806,675 A | 4/1974 | Krom et al. | |
| 3,806,676 A | 4/1974 | Krom et al. | |
| 4,276,453 A * | 6/1981 | Wolter | 200/43.06 |
| 5,066,941 A | 11/1991 | Lau | |
| 5,457,973 A | 10/1995 | Grimmer et al. | |
| 6,237,378 B1 * | 5/2001 | Canard | 70/252 |
| 6,900,399 B1 * | 5/2005 | Wyatt et al. | 200/43.04 |

\* cited by examiner

*Primary Examiner*—Elvin Enad
*Assistant Examiner*—M. Fishman
(74) *Attorney, Agent, or Firm*—Blank Rome LLP

(57) ABSTRACT

A warning system for an ignition switch that includes a housing of the ignition switch and a plunger having at least a portion slidably received in the housing, a key abutment end and a contact abutment end opposite the key abutment end. The plunger is movable between first and second positions with respect to the housing along a longitudinal axis thereof. First and second contacts are positioned in the housing. The first and second contacts are spaced from one another when the plunger is in the first position. The first and second contacts are in contact when the plunger is in the second position. At least one of the first and second contacts is substantially parallel to the longitudinal axis.

17 Claims, 2 Drawing Sheets

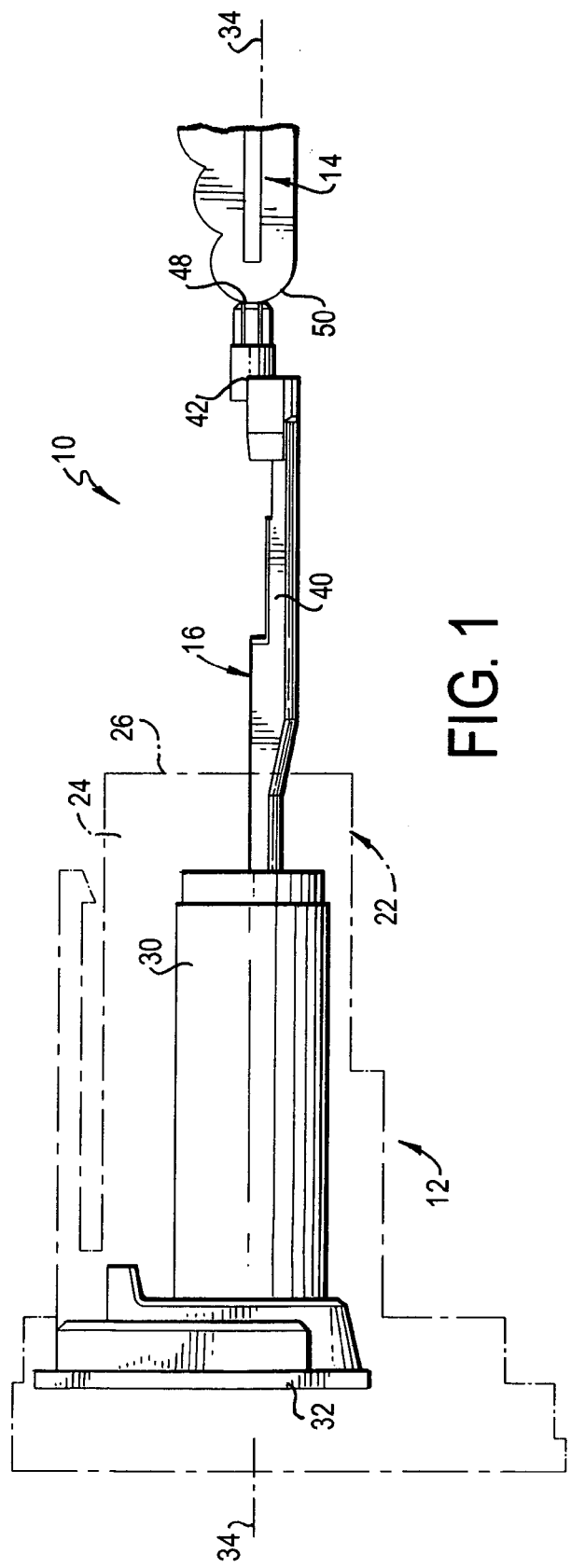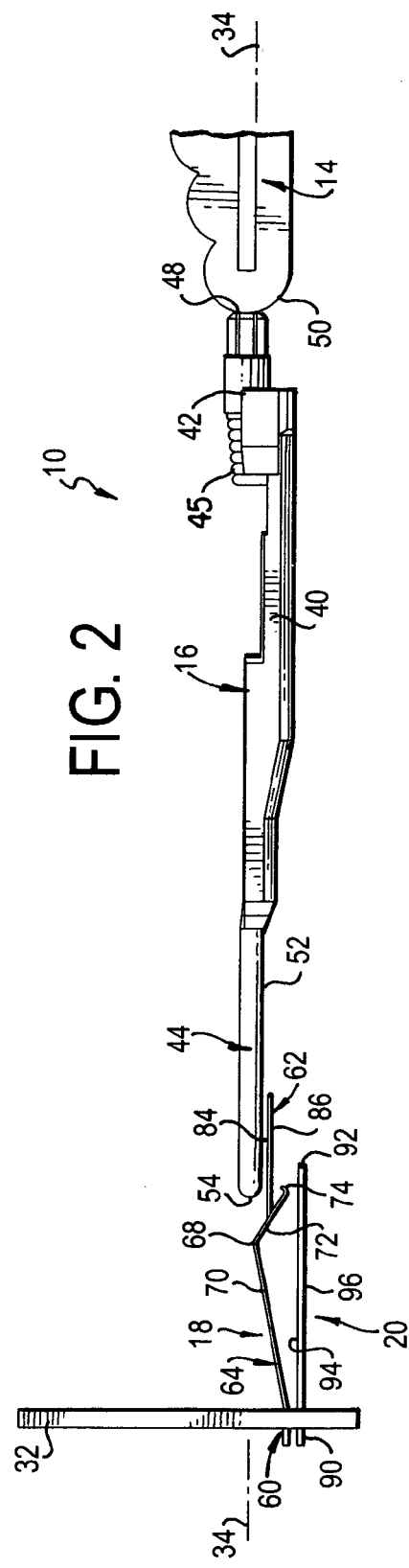

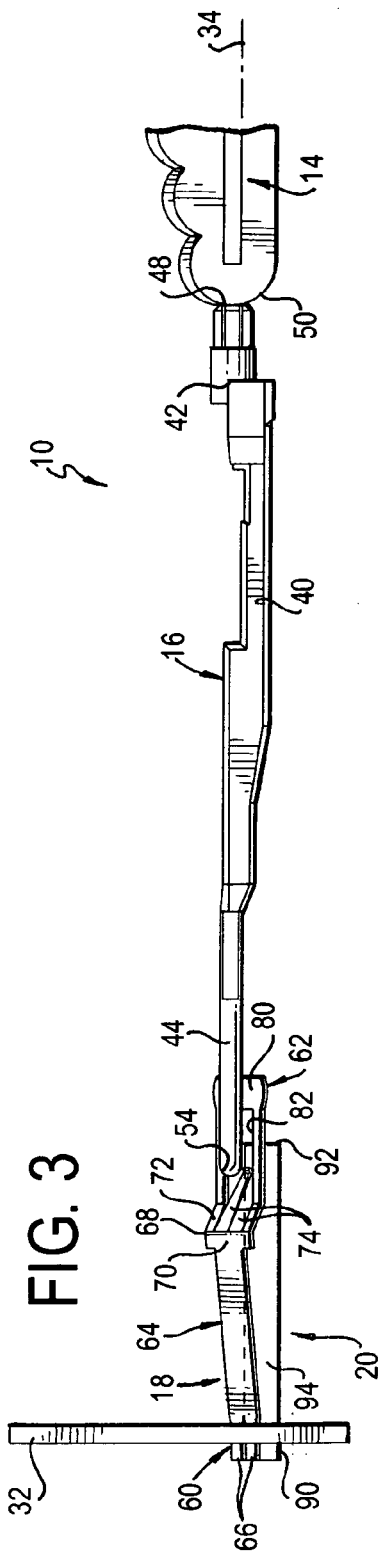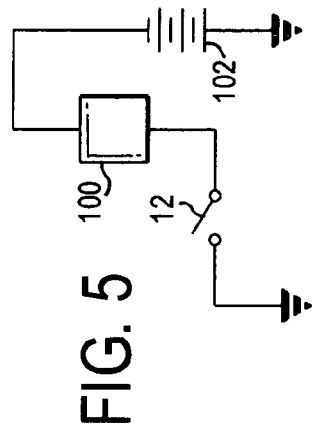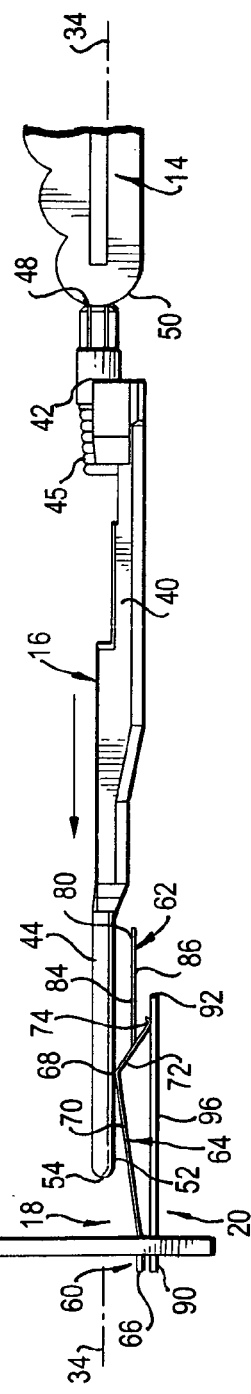

WARNING SYSTEM FOR IGNITION SWITCH

FIELD OF THE INVENTION

The present invention relates to a warning system for an ignition switch. More specifically, the warning system signals the vehicle driver that the key is in the ignition.

BACKGROUND OF THE INVENTION

Conventional key-in warning devices for ignition switches include a plunger that pushes upwardly on one blade until it connects with another blade to indicate to the driver that a key is in the ignition. Due to varying tolerances of ignition switches, the travel of the plunger often varies resulting in damage to the blades. In particular, as the plunger moves upwardly, the blades either bend beyond their yield point or slip off of the tip of the plunger. The uncontrollable variation of the travel of the plunger often results in deformation of the blades and poor contact between the blades.

Examples of conventional key-in warning devices include U.S. Pat. No. 5,066,941 to Lau, U.S. Pat. No. 3,806,676 to Krom et al., U.S. Pat. No. 3,806,675 to Krom et al., U.S. Pat. No. 3,138,789 and U.S. Pat. No. 2,613,258 to Azano, the subject matter of each of which is herein incorporated by reference.

SUMMARY OF THE INVENTION

Accordingly, an object of the present invention is to provide a warning system for an ignition switch which warns the vehicle driver that a key is in the ignition;

Another object of the present invention is to provide a warning system for an ignition switch which reduces deformation to the contacts of the system.

Yet another object of the present invention is to provide a warning system for an ignition switch that ensures good connection between the contacts of the system.

The foregoing objects are attained by a warning system for an ignition switch that includes a housing of the ignition switch and a plunger having at least a portion slidably received in the housing, a key abutment end and a contact abutment end opposite the key abutment end. The plunger is movable between first and second positions with respect to the housing along a longitudinal axis thereof. First and second contacts are positioned in the housing. The first and second contacts are spaced from one another when the plunger is in the first position. The first and second contacts are in contact when the plunger is in the second position. At least one of the first and second contacts is substantially parallel to the longitudinal axis.

The foregoing objects are also attained by a warning system for an ignition switch that includes a housing of the ignition switch and a plunger that has at least a portion slidably received in the housing, a key abutment end and a contact abutment end opposite the key abutment end. The plunger is movable between first and second positions with respect to the housing along a longitudinal axis thereof. First and second contacts are positioned in the housing. The first contact includes a first portion substantially parallel to the longitudinal axis and a second portion inclined with respect to the first portion. The second contact is substantially entirely parallel to the longitudinal axis. The first and second contacts are spaced from one another when the plunger is in the first position. The first and second contacts are in contact when the plunger is in the second position.

Other objects, advantages and salient features of the invention will become apparent from the following detailed description, which, taken in conjunction with the annexed drawings, discloses a preferred embodiment of the present invention

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a side elevational view of the warning system in accordance with an embodiment of the present invention, showing an ignition switch and a plunger being actuated by a key;

FIG. 2 is a side elevational view of the warning system illustrated in FIG. 1, showing the ignition switch with its housing and rotor removed, a printed circuit board and contacts of the ignition switch, and the plunger in a first position;

FIG. 3 is a partial top side perspective view of the warning system illustrated in FIG. 2;

FIG. 4 is a side elevational view of the warning system similar to FIG. 2, except the plunger is shown in a second position; and FIG. 5 is a circuit diagram of the warning system in accordance with the present invention showing the ignition switch connected to a signal.

DETAILED DESCRIPTION OF THE INVENTION

Referring to FIGS. 1–5, a warning system 10 for an ignition switch 12 according to the present invention warns the driver that the key 14 of the vehicle is in the vehicle ignition. In general, the warning system includes a plunger 16 actuated by inserting the key 14 into the ignition that connects a moveable contact 18 and a stationary contact 20 of the ignition switch 12, thereby triggering a signal, such as a light or sound, to warn the driver. Since the movement of the plunger 16 is substantially parallel to the contacts 18 and 20, damage to the contacts 18 and 20 is avoided. The orientation of the contacts 18 and 20 with respect to the plunger 16 as well as the design of contacts 18 and 20 ensure good connection between the contacts when the key 14 is inserted into the ignition switch 12.

As seen in FIG. 1, the ignition switch 12 includes a housing 22 that has a generally cylindrical main portion 24 with opposing first and second ends 26 and 28. Main portion 24 supports a cylindrical rotor member 30. First end 26 of main portion 24 is open to provide access to the rotor member 30. The second end 28 of main body 30 is wider than the first end 26 to accommodate a printed circuit board 32. Rotor member 30 is connected to the printed circuit board 32.

Housing 22 supports plunger 16 so that plunger 16 is slidably received in rotor member 30 and movable along a longitudinal axis 34 between a first position (FIG. 2) and a second position (FIG. 4). Plunger 16 includes a main body 40 that has opposite first and second ends 42 and 44. Main body 40 is shaped to facilitate sliding movement of plunger 16 in and out of rotor member 30 along axis 34. The first end 42 has an abutment member 46 with an abutment surface 48 for abutting the end 50 of the ignition key 14. Abutment surface 48 can be either flat or rounded. The first end 42 includes a coil spring 45 to spring load the plunger 16 so that the plunger 16 will return to its first position when the key 14 is removed from the ignition. The second end 44 of the plunger 16 includes a contact engaging surface 52 and terminates at an abutment end surface 54. Second end 44 is preferably rounded, similar to a pin, but can be flat.

As seen in FIGS. 2–4, movable contact 18 and stationary contact 20 are connected to printed circuit board 32 and are substantially perpendicular to printed circuit board 32. Contacts 18 and 20 are supported in rotor member 30. Movable contact 18 is a resilient member, such as a spring, and includes opposite first and second end portions 60 and 62, and a middle portion 64 therebetween. First end portion 60 includes attachment fingers 66 for extending though and connecting to printed circuit board 32, as best seen in FIG. 3. Middle portion 64 includes a ramp 68 for engaging plunger 16. The ramp 68 is defined by first and second inclined or sloped sections 70 and 72 extending in generally opposite directions, that is away from one another. The angle defined by the second inclined section 72 with respect to a horizontal axis is substantially greater than the angle defined by the first inclined section 70 with respect to a horizontal axis. First inclined section 70 is substantially longer than second inclined section 72. Second inclined section 72 includes resilient legs 74 for engaging stationary contact 20. Although two resilient legs 74 are preferably used, any number of legs 74 can be used including a single leg.

Extending from the middle of second inclined section 72 of ramp 68 is second end portion 62 of movable contact 18. Second end portion 62 includes a tongue 80 with a central aperture 82 that can accommodate legs 74 of middle portion 64 as the contact 18 moves, as best seen in FIG. 3. Tongue 80 includes opposite first and second surfaces 84 and 86 with the first surface 84 facing plunger 16 as the plunger 16 slides into and out of rotor member 30 and the second surface 86 facing stationary contact 20. Tongue 80 is substantially parallel to the longitudinal axis 34 defined by the sliding movement of plunger 16 and remains substantially parallel to axis 34 as plunger 16 slides between its first and second positions.

Stationary contact 20 is substantially flat with an attachment end 90 that extends through and connects to the printed circuit board 32, and an opposite free end 92. Contact 20 includes opposite first and second surfaces 94 and 96 with the first surface 94 facing moveable contact 18. Attachment end 90 of stationary contact 20 is spaced from attachment fingers 66 of moveable contact 18 with respect to printed circuit board 32. Stationary contact 20 is substantially parallel to longitudinal axis 34. Each of moveable and stationary contacts 18 and 20 can be made as one-piece unitary contacts. Moveable contact 18 is preferably longer than stationary contact, as seen in FIGS. 3 and 4.

In operation, the key 14 is inserted into the key cylinder of the ignition and the end 50 of key 14 pushes directly on the abutment surface 48 of plunger 16. Plunger 16 then slides into rotor member 30 along longitudinal axis 34 in a direction from the housing first end 26 toward the housing second end 28, such that the travel of plunger 16 is directly proportional to the travel of key 14. The coil spring 45 disposed around the first end 42 of plunger 16 is compressed against a part (not shown) of the housing 22. In the first position of plunger 16, as seen in FIG. 2, moveable and stationary contacts 18 and 20 are spaced from one another. As the key 14 and plunger 16 slide into the rotor member 30, the abutment end surface 54 of plunger 16 abuts the second inclined section 72 of ramp 68 of moveable contact 18 forcing the middle portion 64 of moveable contact 18 toward stationary contact 20. As plunger 16 passes by moveable contact 18 to its second position, the contact engaging surface 52 engages ramp 68 forcing legs 74 of moveable 18 into contact with the first surface 94 of stationary contact 20, as seen in FIG. 4. When legs 74 are flattened onto surface 94 of stationary contact 20, central aperture 82 of moveable contact 18 can accommodate legs 74 and remain substantially parallel to plunger 16. This ensures a good connection between contacts 18 and 20.

When moveable and stationary contacts 18 and 20 connect, a signal 100 is triggered by closing the circuit between ignition switch 12 and signal 100. As seen in FIG. 5, signal 100 is connected to the vehicle battery 102 and ignition switch 12. When the contacts 18 and 20 connect and close the circuit, signal 100 warns the driver that the key 14 is in the ignition. Contacts 18 and 20 remain in contact until the key 14 is removed from the ignition allowing the spring loaded plunger 16 to slide back to its first position in a direction from the housing end 28 toward housing first end 26, and allowing moveable contact 18 to spring back to its original position with contacts 18 and 20 being spaced from one another. The circuit is then opened, thereby stopping signal 100. Signal 100 can be any type of visual or audio indicator such as an LED or beep. Because plunger 16 is not pushing up on contacts 18 and 20, i.e. it is not perpendicular to contacts 18 and 20, deformation of the contacts is avoided. Also, the flattening of contact 18 onto contact 20 as plunger 16 passes by ensures good connection between contacts 18 and 20.

While a particular embodiment has been chosen to illustrate the invention, it will be understood by those skilled in the art that various changes and modification can be made therein without departing from the scope of the invention as defined in the appended claims.

What is claimed is:

1. A warning system for an ignition switch, comprising:
a housing of the ignition switch;
a plunger having at least a portion slidably received in said housing, a key abutment end and a contact abutment end opposite said key abutment end, and said plunger being movable between first and second positions with respect to said housing along a longitudinal axis thereof, and
first and second contacts positioned in said housing, said first and second contacts being spaced from one another when said plunger is in said first position, and said first and second contacts being in contact when said plunger is in said second position, and at least one of said first and second contacts being substantially parallel to said longitudinal axis, and
the other of said first and second contacts including first and second end portions and a middle portion, said first end portion being substantially parallel to said longitudinal axis, and said middle portion being inclined with respect to said first portion, thereby forming a ramp for contact with said plunger.

2. A warning system according to claim 1, wherein
a portion of the other of said first and second contacts is substantially parallel to said longitudinal axis.

3. A warning system according to claim 1, wherein
said plunger contacts one of said first and second contacts at said contact abutment end to push said one of said first and second contacts into contact with the other of said first and second contacts.

4. A warning system according to claim 1, wherein the other of said first and second contacts includes an inclined section that contacts said contact abutment end of said plunger when said plunger moves from said first position to said second position.

5. A warning system according to claim 1, wherein at least one of said first and second contacts is a spring.

6. A warning system according to claim 1, wherein each of said first and second contacts are connected to a printed circuit board.

7. A warning system according to claim 1, wherein said middle portion includes first and second legs extending therefrom for contact with said one of said first and second contacts.

8. A warning system according to claim 1, wherein said first portion includes an aperture for accommodating said first and second legs as said plunger moves from said first position to said second position.

9. A warning system for an ignition switch, comprising:
a housing of the ignition switch;
a plunger having at least a portion slidably received in said housing, a key abutment end, and a contact abutment end opposite said key abutment end, and said plunger being movable between first and second positions with respect to said housing along a longitudinal axis thereof; and
first and second contacts positioned in said housing, said first contact including a first portion substantially parallel to said longitudinal axis and a second portion inclined with respect to said first portion, said second contact being substantially entirely parallel to said longitudinal axis, said first and second contacts being spaced from one another when said plunger is in said first position, said first and second contacts being in contact when said plunger is in said second position, and
said contact abutment end of said plunger engaging said second portion of said first contact as said plunger moves from said first position to said second position.

10. A warning system according to claim 9, further comprising
a printed circuit board disposed in said housing and attached to said first and second contacts.

11. A warning system according to claim 9, wherein said second portion includes a plurality of legs for contacting said second contact, and a tongue substantially parallel to said longitudinal axis.

12. A warning system according to claim 9, wherein said plunger is spring loaded.

13. A warning system for an ignition switch, comprising:
a housing of the ignition switch, said housing including first and second contacts positioned therein; and
a plunger having at least a portion slidably received in said housing, a key abutment end and a contact abutment end opposite said key abutment end, and said plunger being slidable between first and second positions with respect to said housing and said first and second contacts along a longitudinal axis of said housing; and
wherein said first and second contacts being spaced from one another when said plunger is in said first position, and said first and second contacts being in contact when said plunger is in said second position, at least one of said first and second contacts being substantially parallel to said longitudinal axis, and
the other of said first and second contacts including first and second end portions and a middle portion, said first end portion being substantially parallel to said longitudinal axis, and said middle portion being inclined with respect to said first portion, thereby forming a ramp for contact with said plunger.

14. A warning system according to claim 13, wherein said plunger contacts one of said first and second contacts at said contact abutment end to push said one of said first and second contacts into contact with the other of said first and second contacts.

15. A warning system according to claim 13, wherein the other of said first and second contacts includes an inclined section that contacts said contact abutment end of said plunger when said plunger moves from said first position to said second position.

16. A warning system according to claim 13, wherein said middle portion includes first and second legs extending therefrom for contact with said one of said first and second contacts.

17. A warning system according to claim 13, wherein said first portion includes an aperture for accommodating said first and second legs as said plunger moves from said first position to said second position.

\* \* \* \* \*

UNITED STATES PATENT AND TRADEMARK OFFICE
CERTIFICATE OF CORRECTION

PATENT NO. : 7,161,099 B2
APPLICATION NO. : 10/990390
DATED : January 9, 2007
INVENTOR(S) : Chris Wyatt et al.

Page 1 of 1

It is certified that error appears in the above-identified patent and that said Letters Patent is hereby corrected as shown below:

At col. 1, line 26, after "3,138,789" insert --to Jacobsen,--.

Signed and Sealed this

Twenty-third Day of December, 2008

JON W. DUDAS
*Director of the United States Patent and Trademark Office*